US012106669B2

(12) United States Patent
Kurehashi et al.

(10) Patent No.: US 12,106,669 B2
(45) Date of Patent: Oct. 1, 2024

(54) CONTROL APPARATUS, MOVABLE OBJECT, CONTROL METHOD, AND COMPUTER READABLE STORAGE MEDIUM

(71) Applicant: HONDA MOTOR CO., LTD., Tokyo (JP)

(72) Inventors: Takahiro Kurehashi, Saitama (JP); Moriya Horiuchi, Saitama (JP); Shigeru Inoue, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 17/835,908

(22) Filed: Jun. 8, 2022

(65) Prior Publication Data

US 2022/0406189 A1 Dec. 22, 2022

(30) Foreign Application Priority Data

Jun. 18, 2021 (JP) ................. 2021-101626

(51) Int. Cl.
*B60W 50/14* (2020.01)
*B60W 40/04* (2006.01)
(Continued)

(52) U.S. Cl.
CPC ............. *G08G 1/164* (2013.01); *B60W 40/04* (2013.01); *B60W 50/14* (2013.01); *G06V 20/52* (2022.01);
(Continued)

(58) Field of Classification Search
CPC .......... G08G 1/166; G08G 1/162; G08G 1/04; G08G 1/005; G08G 1/096725;
(Continued)

(56) References Cited

U.S. PATENT DOCUMENTS 9,820,091 B1* 11/2017 Kumar ................. H04W 4/02
2005/0073438 A1* 4/2005 Rodgers ............... G08G 1/161
340/944

(Continued)

FOREIGN PATENT DOCUMENTS

CN 107749193 A 3/2018
CN 109996212 A 7/2019
(Continued)

OTHER PUBLICATIONS

Office Action issued for counterpart Chinese Application 202210488006.2, issued by The State Intellectual Property Office of People's Republic of China on Jun. 17, 2023.

*Primary Examiner* — Stephen Holwerda

(57) ABSTRACT

A control apparatus includes a risk area identification unit for identifying a risk area outside a movable object with respect to a movement of the movable object based on an image captured by an image capturing apparatus mounted on the movable object, and a transmission control unit for performing control to transmit risk area information including position information of the risk area, and precision information related to a calculation precision of the position information to an outside of the movable object without designating a destination, wherein the transmission control unit transmits the position information and the precision information to cause a terminal having received the position information and the precision information to determine whether a position thereof corresponds to an inside of the risk area, and cause an alert unit included in the terminal to output an alert when it is determined that the terminal is inside the risk area.

18 Claims, 7 Drawing Sheets

(51) Int. Cl.
*G06V 20/52* (2022.01)
*G06V 20/58* (2022.01)
*G08G 1/09* (2006.01)
*G08G 1/0967* (2006.01)
*G08G 1/16* (2006.01)
*H04W 4/029* (2018.01)
*H04W 4/12* (2009.01)
*H04W 4/90* (2018.01)

(52) U.S. Cl.
CPC ....... *G06V 20/58* (2022.01); *G08G 1/096725* (2013.01); *G08G 1/166* (2013.01); *H04W 4/029* (2018.02); *H04W 4/12* (2013.01); *H04W 4/90* (2018.02); *B60W 2420/403* (2013.01); *B60W 2554/4029* (2020.02); *B60W 2554/4041* (2020.02)

(58) Field of Classification Search
CPC .... G08G 1/164; G08G 1/096708; G08G 1/16; G08G 1/167; G08G 1/0133; G08G 1/163; H04W 4/12; H04W 4/90; H04W 4/029; H04W 4/40; H04W 4/021; H04W 4/06; B60W 40/04; B60W 50/14; B60W 2554/4041; B60W 2554/4029; B60W 2420/403; B60W 30/09; B60W 2556/50; B60W 2050/143; B60W 2556/10; B60W 2556/65; B60W 2556/45; B60W 2556/05; B60W 30/0956; B60W 30/0953; B60W 2554/4042; B60W 2050/146; B60W 2554/20; B60W 2050/0064; B60W 2554/406; B60W 2756/10; G06V 20/54; G06V 20/52; G06V 20/58; G06V 20/56
See application file for complete search history.

(56) References Cited

U.S. PATENT DOCUMENTS

| | | | |
|---|---|---|---|
| 2011/0090093 A1* | 4/2011 | Grimm | G08G 1/162 340/901 |
| 2013/0060400 A1* | 3/2013 | Hahne | G08G 1/161 701/1 |
| 2013/0201036 A1* | 8/2013 | Stahlin | H04W 52/0229 340/944 |
| 2014/0009275 A1* | 1/2014 | Bowers | G06Q 20/145 340/436 |
| 2014/0191884 A1* | 7/2014 | Maeda | H04W 4/40 340/944 |
| 2014/0324330 A1* | 10/2014 | Minemura | G08G 1/166 701/300 |
| 2015/0035685 A1* | 2/2015 | Strickland | B60Q 9/008 340/901 |
| 2017/0018187 A1* | 1/2017 | Kim | G08G 1/005 |
| 2018/0042039 A1 | 2/2018 | Senba | |
| 2018/0129888 A1* | 5/2018 | Schubert | G06T 11/20 |
| 2020/0209871 A1 | 7/2020 | Xiong | |
| 2020/0312140 A1 | 10/2020 | Kurehashi | |
| 2020/0349842 A1* | 11/2020 | Radha | G06V 10/82 |
| 2020/0406747 A1* | 12/2020 | Sakai | G08G 1/167 |
| 2021/0150902 A1 | 5/2021 | Okubi | |
| 2021/0350706 A1 | 11/2021 | Yoshitake | |

FOREIGN PATENT DOCUMENTS

| | | |
|---|---|---|
| CN | 111762195 A | 10/2020 |
| CN | 112639914 A | 4/2021 |
| CN | 112908032 A | 6/2021 |
| JP | 2017062583 A | 3/2017 |
| JP | 2018022391 A | 2/2018 |
| WO | 2018179394 A1 | 10/2018 |
| WO | 2019230683 A1 | 12/2019 |

\* cited by examiner

CONTROL APPARATUS, MOVABLE OBJECT, CONTROL METHOD, AND COMPUTER READABLE STORAGE MEDIUM

The contents of the following Japanese patent application(s) are incorporated herein by reference:
NO. 2021-101626 filed on Jun. 18, 2021

BACKGROUND

1. Technical Field

The present invention relates to a control apparatus, a movable object, a control method, and a computer readable storage medium.

2. Related Art

Patent document 1 describes an information processing apparatus for transmitting, when it is determined that it is necessary to transmit information based on a position of an on-vehicle terminal, the information to a terminal having a predetermined priority among a plurality of terminals. List of cited references
Patent document 1: Japanese Patent Application Publication No. 2018-022391

BRIEF DESCRIPTION OF THE DRAWINGS

FIG. 3 conceptually illustrates position information of a risk area managed by a control apparatus 24a.
FIG. 4 illustrates one example of position information detected by a control apparatus 24d, a camera system 60, and a terminal 82a.
FIG. 5 illustrates another example of the position information detected by the control apparatus 24d, the camera system 60, and the terminal 82a.

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments necessarily have to be essential to solving means of the invention.

Figure 1:
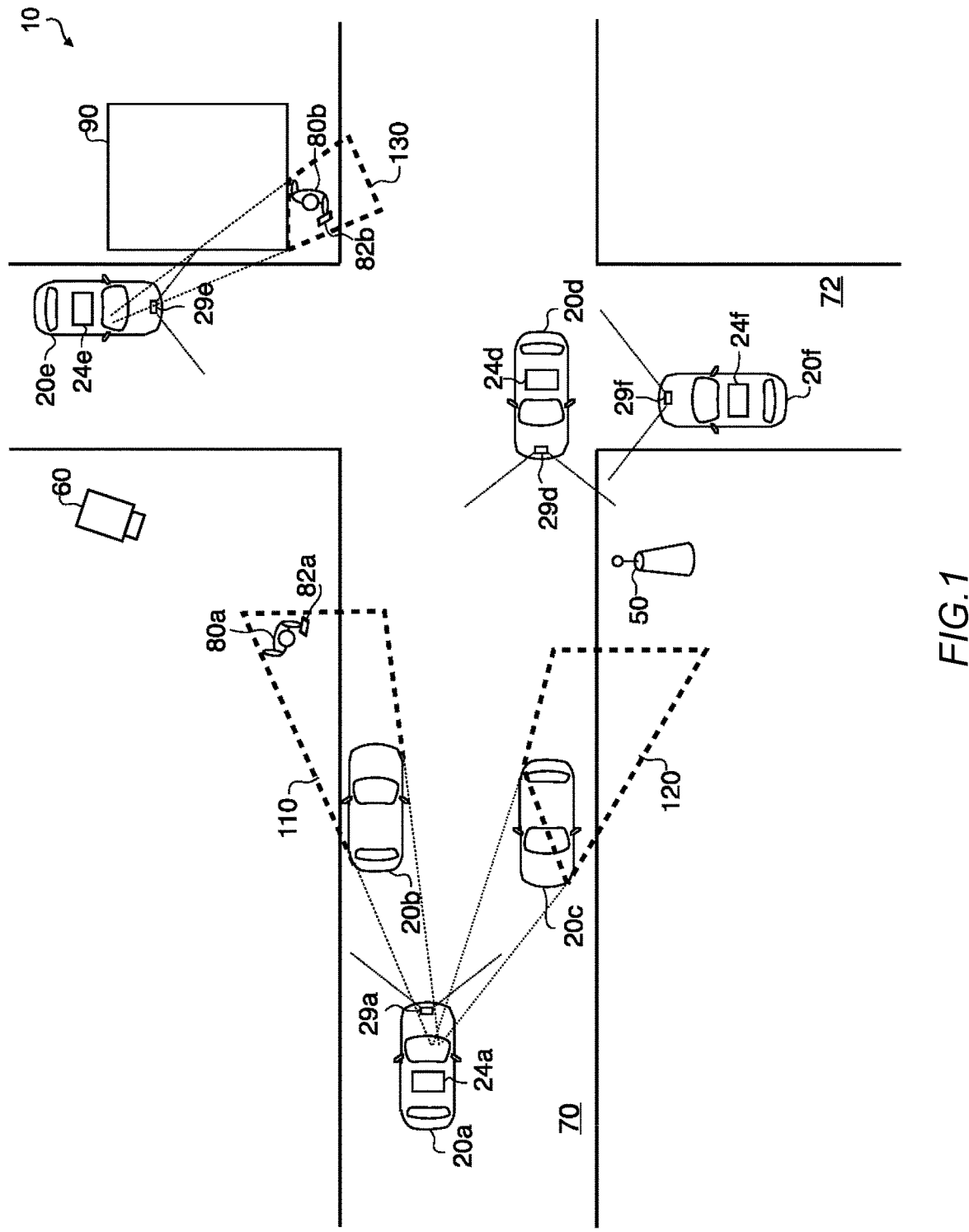
FIG. 1 schematically illustrates a usage scene of a warning system 10.

FIG. 1 schematically illustrates a usage scene of a warning system 10. The warning system 10 includes a vehicle 20a, a vehicle 20b, a vehicle 20c, a vehicle 20d, a vehicle 20e, and a vehicle 20f, a terminal 82a and a terminal 82b, and a camera system 60.

According to the present embodiment, the vehicle 20a, the vehicle 20b, the vehicle 20c, the vehicle 20d, the vehicle 20e, and the vehicle 20f may be collectively referred to as a "vehicle 20". The vehicle 20 is one example of a movable object. In addition, the terminal 82a and the terminal 82b are terminals respectively possessed by a pedestrian 80a and a pedestrian 80b. According to the present embodiment, the pedestrian 80a and the pedestrian 80b may be collectively referred to as a "pedestrian 80". In addition, the terminals 82a and 82b may be collectively referred to as a "terminal 82".

The camera system 60 is a camera system provided to infrastructure. The camera system 60 has an image pickup function, an image recognition function, and a communication function. The camera system 60 is configured to perform recognition of a picked-up image to recognize position information of a predetermined target such as the pedestrian 80 from the image. The camera system 60 is utilized as a camera configured to collect information for a purpose of performing travelling assistance of the vehicle.

The vehicle 20a includes a sensor 29a and a control apparatus 24a. The sensor 29a is configured by including a camera. The control apparatus 24a includes a processing function of information acquired by the sensor 29a, and a communication function.

In FIG. 1, the vehicle 20a is a vehicle traveling along a road 70. The vehicle 20b is a vehicle parked on the road 70. For the vehicle 20a, an area 110 on an advancing direction side of the vehicle 20a in front of the parked vehicle 20b is an area where it is difficult to be visually recognized from a position of the vehicle 20a. In addition, the vehicle 20c is a vehicle traveling along an opposite lane of the road 70 when viewed from the vehicle 20a. An area 120 on the advancing direction side of the vehicle 20a behind the vehicle 20c is an area where it is difficult to be visually recognized from the position of the vehicle 20a. Therefore, the control apparatus 24a is configured to detect the area 110 and the area 120 that are not on a line of sight from the vehicle 20a as a risk area from an image in the advancing direction which has been acquired by the sensor 29a. The control apparatus 24a transmits risk area information including position information of the area 110 and the area 120 by wireless communication. It should be noted that the control apparatus 24a includes a detection precision of the position information in the risk area information and transmits the risk area information.

In FIG. 1, the vehicle 20d is an oncoming vehicle for the vehicle 20a, and is a vehicle traveling in a position where the area 110 and the area 120 can be visually recognized. When the risk area information transmitted from the vehicle 20a is received, a control apparatus 24d of the vehicle 20d judges whether a pedestrian is present in each of the area 110 and the area 120 from an image acquired by a sensor 29d. When the presence of the pedestrian 80a is detected from the image acquired by the sensor 29d, the control apparatus 24d transmits response information including position information of the pedestrian 80a and a detection precision of the position information to the vehicle 20a by the wireless communication. In addition, when the absence of a pedestrian in the area 120 is detected from the image acquired by the sensor 29d, the control apparatus 24d transmits response information indicating the absence of the pedestrian in the area 120 to the vehicle 20a by the wireless communication.

When the risk area information transmitted from the vehicle 20a is received, the terminal 82a acquires current position information of the terminal 82a, and transmits response information including the acquired current position information and a detection precision of the position information to the vehicle 20a by the wireless communication.

When the risk area information transmitted from the vehicle 20a is received by the communication function, the camera system 60 detects the position of the pedestrian 80a in the area 110 from the image acquired by the image pickup function. The camera system 60 transmits response information including position information of the pedestrian 80a and a detection precision of the position information to the vehicle 20a by the wireless communication.

In the vehicle 20a, when the response information is received from each of the vehicle 20d, the camera system 60, and the terminal 82a, the control apparatus 24a judges whether a pedestrian is present in the risk area by using precision information included in the response information, and performs assistance control such as warning output when it is judged that a pedestrian is present in the risk area. The terminal 82a judges whether the terminal 82a is present in the risk area based on the risk area information and the detection precision of the position information included in the response information, and the detection precision of the position information detected by the terminal 82a itself, and performs the warning output for the pedestrian 80a when it is judged that the terminal 82a is present in the risk area.

It should be noted that in FIG. 1, it is difficult to visually recognize an area 130 since a building 90 becomes an obstacle from a position of the vehicle 20e travelling on a road 72, for example. For this reason, a control apparatus 24e of the vehicle 20e determines that the area 130 is a risk area, and transmits risk area information including position information of the area 130 by the wireless communication.

In FIG. 1, the vehicle 20f is an oncoming vehicle for the vehicle 20e, and is a vehicle stopping in a position where the area 130 can be visually recognized. When the risk area information transmitted from the vehicle 20e is received, a control apparatus 24f of the vehicle 20f judges whether a pedestrian is present in the area 130 from an image acquired by a sensor 29f. When it is detected that the pedestrian 80b is present in the area 110 from the image acquired by the sensor 29f, the control apparatus 24f transmits response information including position information of the pedestrian 80b and a detection precision of the position information to the vehicle 20e by the wireless communication. In addition, when the risk area information is received, the terminal 82b acquires a current position of the terminal 82b, and transmits response information including the acquired current position information and a detection precision of the position information to the vehicle 20e by the wireless communication. In the vehicle 20e, when the response information is received from the vehicle 20f and the terminal 82b, the control apparatus 24e judges whether a pedestrian is present in the risk area by using precision information included in the response information, and performs assistance control such as warning output for an occupant of the vehicle 20e when it is judged that a pedestrian is present in the risk area. The terminal 82b judges whether the terminal 82b is present in the risk area based on the risk area information and the detection precision of the position information included in the response information, and the detection precision of the position information detected by the terminal 82b itself, and performs warning output for the pedestrian 80b when it is judged that the terminal 82b is present in the risk area.

In this manner, a control apparatus 24 transmits the risk area information including the position information of the risk area and the detection precision by broadcast. With this configuration, the terminal 82 that has received the risk area information can more safety judge whether the terminal 82 is present in the risk area based on the detection precision included in the risk area information. Thus, warning output can be appropriately performed for the pedestrian 80. In addition, the plurality of terminals 82, the camera system 60, and the other vehicle 20 that have received the risk area information transmits the position information of the pedestrian present in the risk area or in a surrounding of the risk area to the control apparatus 24 together with the detection precision, so that the control apparatus 24 can more accurately judge whether the pedestrian is present in the risk area. Thus, the warning output can be safety performed for the terminal 82, and also more accurate assistance control can be perform in the vehicle 20. It should be noted that the risk area is a recognition of a state related to an external environment recognized by the vehicle 20 or the control apparatus 24. The risk area may be, for example, an area where there is a risk for the pedestrian 80 or the vehicle 20. The risk area may be, for example, an area where it is necessary to perform a safety check for the pedestrian 80 or the vehicle 20.

It should be noted that communication among the control apparatus 24 and the terminal 82, and the control apparatus 24 and the camera system 60 of the other vehicle 20 is executed by direct communication. For example, the control apparatus 24 performs the direct communication with the terminal 82 and the control apparatus 24 and the camera system 60 of the other vehicle 20 by short distance direct communication in Cellular-V2X. Examples of the short distance direct communication in Cellular-V2X include communication standards such as LTE-V2X PC5 and 5G-V2X PC5 (according to the present embodiment, which may be abbreviated as "PC5"). A mode using Wi-Fi (registered trademark) or dedicated short range communications (DSRC) may be adopted as the direct communication. The control apparatus 24 may perform the direct communication via a base transceiver station 50. As the direct communication, in addition to Cellular-V2X or DSRC (registered trademark), any direct communication standard such as Bluetooth (registered trademark) may be adopted. The control apparatus 24 may perform the direct communication with the terminal 82 and the control apparatus 24 and the camera system 60 of the other vehicle 20 by using communication infrastructure included in intelligent transport systems (ITS).

It should be noted that according to the present embodiment, for ease of the description, a case will be considered where it is judged on whether a pedestrian is present in a risk area. The pedestrian refers to a person who can make a passage on a road by a method without relaying on a vehicle. The pedestrian includes a person who makes a passage on a road using a wheel chair or the like. However, it may be judged on whether not only the pedestrian but also any movable object such as a person other than the pedestrian or another vehicle is present in the risk area. The person other than the pedestrian may include a person aboard a stopped vehicle.

Figure 2:
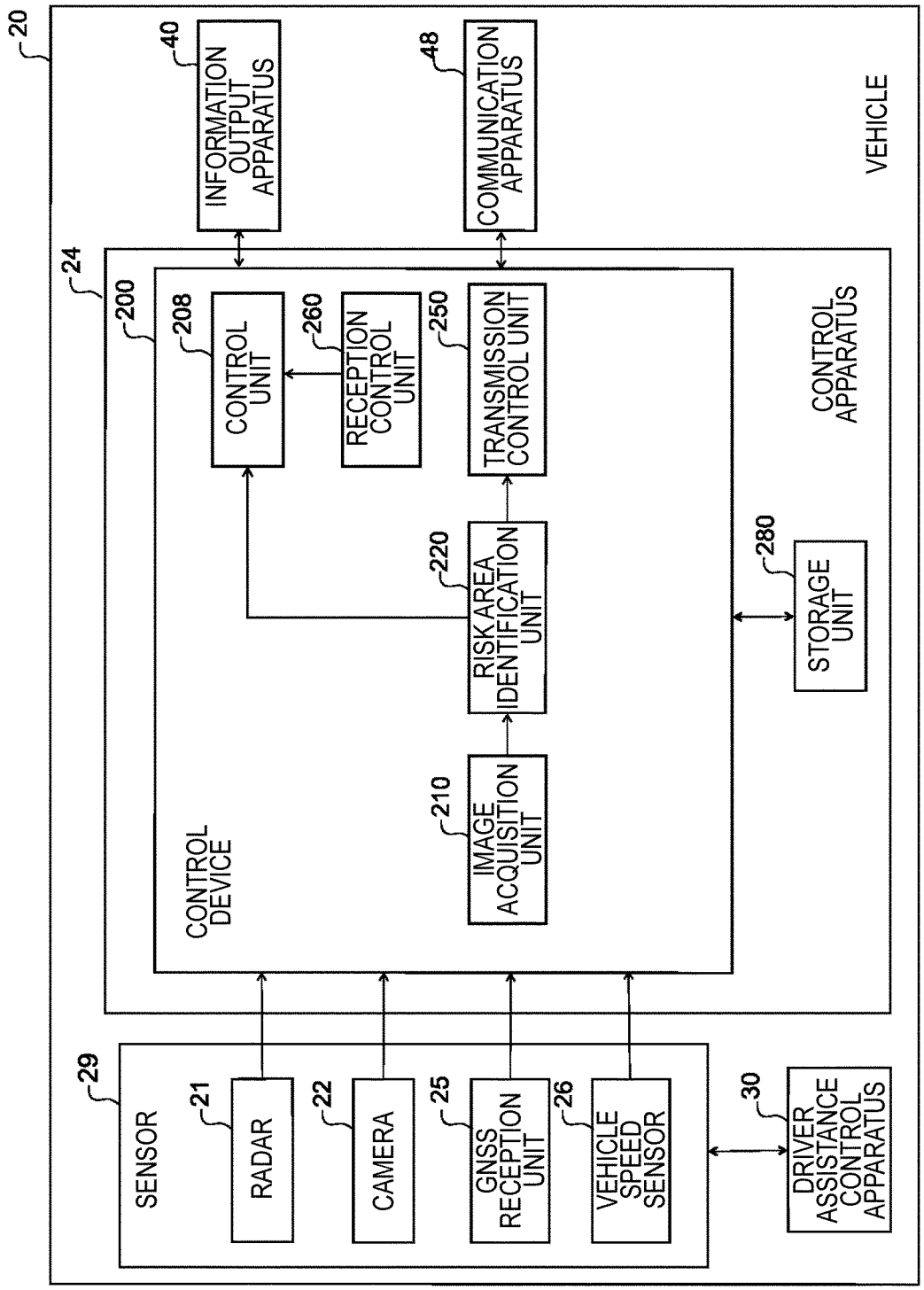
FIG. 2 illustrates a system configuration of a vehicle 20.

FIG. 2 illustrates a system configuration of the vehicle 20. The vehicle 20 includes a sensor 29, a driver assistance control apparatus 30, the control apparatus 24, a communication apparatus 48, and an information output apparatus 40.

The sensor 29 includes a radar 21, a camera 22, a GNSS reception unit 25, and a vehicle speed sensor 26. The radar 21 may be a LiDAR, a millimeter wave radar, or the like. The GNSS reception unit 25 is configured to receive radio waves transmitted from a global navigation satellite system (GNSS) satellite. The GNSS reception unit 25 generates information indicating a current position of the vehicle 20 based on a signal received from the GNSS satellite. The camera 22 is one example of an image pickup unit mounted on the vehicle 20. The camera 22 is configured to generate image information by picking up an image of a surrounding of the vehicle 20. For example, the camera 22 generates the image information by picking up an image in the advancing direction of the vehicle 20. The camera 22 may be a single-lens camera. The camera 22 may be a multi-lens camera, and may be a camera that can acquire information of a distance to an object. It should be noted that the sensor 29 may include a position sensor such as an odometer, or an inertial measurement unit (IMU) such as an acceleration sensor or an orientation sensor.

The driver assistance control apparatus 30 is configured to perform driver assistance of the vehicle 20 by using information detected by the sensor 29. The driver assistance control apparatus 30 may be realized by an ECU having a function of advanced driver-assistance systems (ADAS).

The communication apparatus 48 is responsible for direct communication between the terminal 82 and the other vehicle 20. For example, the communication apparatus 48 is responsible for wireless communication by PC5.

The information output apparatus 40 is an apparatus configured to output warning information. The information output apparatus 40 may have a human machine interface (HMI) function. The information output apparatus 40 may include a head-up display or a navigation system. The information output apparatus 40 may also be a mobile terminal possessed by an occupant of the vehicle 20. The information output apparatus 40 may include a sound output apparatus configured to output warning information by a sound.

The control apparatus 24 includes a control device 200 and a storage unit 280. The control device 200 is realized by a circuit such as an arithmetic processing apparatus including, for example, a processor. The storage unit 280 is realized by including a nonvolatile storage medium. The control device 200 is configured to perform processing by using information stored in the storage unit 280. The control device 200 may be realized by an electronic control unit (ECU) including a microcomputer provided with a CPU, a ROM, a RAM, an I/O, a bus, and the like.

The control device 200 includes an image acquisition unit 210, a risk area identification unit 220, a control unit 208, a transmission control unit 250, and a reception control unit 260. It should be noted that a functional configuration of the control device 200 illustrated in FIG. 2 may be a functional configuration responsible for a functional part of the control apparatus 24a of the vehicle 20a described with reference to FIG. 1. It should be noted that a mode may be adopted in which the control device 200 does not have a part of functions in a function block illustrated in FIG. 2. For example, a mode may be adopted in which only a part of functions is implemented in the control device 200, and the other function is implemented as a function of the sensor 29 or the other circuit.

The image acquisition unit 210 is configured to acquire image information of an image outside the vehicle 20. The image acquisition unit 210 acquires an image from the camera 22 installed in the vehicle 20.

The risk area identification unit 220 is configured to identify a risk area outside the vehicle 20 with respect to a movement of the vehicle 20 based on an image captured by the camera 22 mounted on the vehicle 20. For example, the risk area identification unit 220 identifies an area that is not on a line of sight from a position of the vehicle 20 as the risk area. The risk area identification unit 220 determines the area that is not on the line of sight by recognizing a target object from the image picked up by the camera 22.

It should be noted that when viewed from a position of the vehicle 20, for example, the area that is not on line of sight is position information of an area where an occlusion occurs through shielding by a three-dimensional object such as another stopped vehicle, a building, or a street tree. The risk area identification unit 220 determines that the position is not on the line of sight by recognizing a specific three-dimensional object from an image. The risk area identification unit 220 may identify a non-line-of-sight area based on image information and map information. The risk area identification unit 220 may receive position information of the non-line-of-sight area which is transmitted from an external apparatus such as the other vehicle 20 or the base transceiver station 50, and identify the non-line-of-sight area based on the received position information of the non-line-of-sight area. The external apparatus may be the other vehicle 20 passing through a position near the vehicle 20 or a server configured to collect the position information of the non-line-of-sight area. The server configured to collect the position information of the non-line-of-sight area may be an MEC server connected to the base transceiver station 50. The MEC server may hold the position information of the non-line-of-sight area which is transmitted from a plurality of vehicles passing nearby, and transmit the hold position information of the non-line-of-sight area to the vehicle 20 passing nearby.

The transmission control unit 250 is configured to perform control to transmit, to the outside of the vehicle 20 without designating a destination, risk area information including the position information of the risk area and precision information related to a calculation precision of the position information. To be specific, the position information and the precision information are transmitted in a manner that the transmission control unit 250 causes a terminal that has received the position information and the precision information to execute a determination on whether a position of the terminal corresponds to the inside of the risk area based on the position information and the precision information, and causes an alert unit included in the terminal to output an alert when it is determined that the terminal is inside the risk area.

The precision information may include information indicating at least one of accuracy information of a positioning precision by a global positioning system or a classification of a correction technique used for positioning by the global positioning system.

The transmission control unit 250 may perform control to transmit the position information of the risk area without designating a destination. For example, the transmission control unit 250 may perform control to transmit a plurality of latitude and longitude coordinates of the risk area without designating a destination. It should be noted that the position information of the risk area may be a plurality of pieces of coordinate information of the risk area. The position information of the risk area may be a plurality of pieces of coordinate information indicating a range of the risk area. When the risk area is polygonal, the plurality of coordinate information may be coordinate information of vertices of a polygon. The position information of the risk area may include coordinate information and distance information from a position indicated by the coordinate information. For example, coordinate information of a specific point of the risk area and distance information representing a size of the risk area while the point is set as a reference may be included. The position information of the risk area may be latitude and longitude coordinate information representing a geographical position of the risk area. The transmission control unit 250 may transmit the risk area information by broadcast.

It should be noted that according to the present embodiment, "transmission to the outside of the vehicle 20" by the control of the transmission control unit 250 may be transmission by broadcast to a surrounding communication device without designating a destination. In addition, "without designating a destination" indicates that a destination is not designated by the control of the transmission control unit 250, and transfer may be performed by another apparatus or terminal that has received the transmission, and at that moment, designation of a destination may be performed by the other apparatus or terminal. "Transmission to the outside of the vehicle 20" may be transmission to be performed in a manner that a communication device outside the vehicle 20 can receive transmitted information irrespective of whether the transmitted information can be received by the communication device in the vehicle 20.

The reception control unit 260 is configured to perform control to receive response information including position information of another movable object and precision information related to a calculation precision of the position information as the response information to the risk area information. The control unit 208 is configured to execute control on the vehicle 20 based on the position information and the precision information included in the response information. The other movable object is, for example, another vehicle 20. The response information may include a current position acquired by the terminal 82 that has received the risk area information, and precision information related to a calculation precision of the current position.

The response information may include position information recognized by an external apparatus that is outside the vehicle 20 and that can recognize the inside of the risk area, and precision information of the position information. According to the present embodiment, the external apparatus is another vehicle 20 or camera system 60.

When a plurality of pieces of response information are received as the response information of the risk area information, the control unit 208 more favorably selects position information included in the response information including higher precision information from among the plurality of response information, and executes the control on the vehicle 20 based on the selected position information. The control unit 208 executes driver assistance of the vehicle 20 or an alert for an occupant of the vehicle 20.

The control unit 208 controls the execution of the driver assistance of the vehicle 20 or the alert for the occupant of the vehicle 20. For example, when the information output apparatus 40 includes a head-up display, the control unit 208 may cause the head-up display of the vehicle 20*a* to output light for forming a mark as warning information indicating that a pedestrian is present in the risk area. In addition, the control unit 208 causes the head-up display to output light for forming a mark in a display region corresponding to a position of the risk area where the pedestrian is present. The control unit 208 may project the light for forming the mark towards a reflective part provided to a windshield of the vehicle 20. It should be noted that the control unit 208 may output the warning information by a sound or a character. The control unit 208 may control travelling of the vehicle 20 through the driver assistance control apparatus 30.

Figure 3:
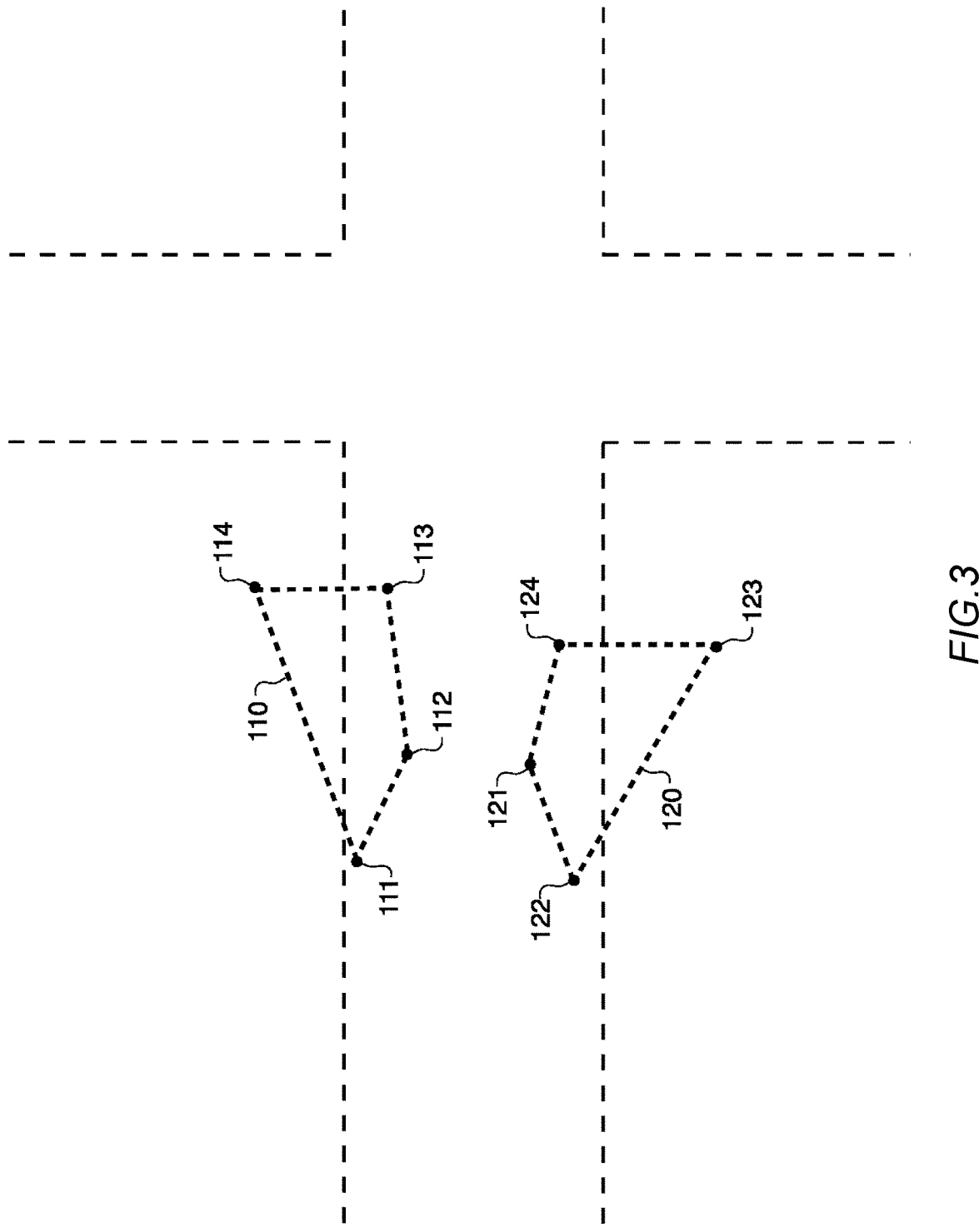

FIG. 3 conceptually illustrates the position information of the risk area managed by the control apparatus 24*a*. Herein, a case will be illustrated where the area 110 and the area 120 that are not on the line of sight which are identified by the risk area identification unit 220 are set as the risk area.

In the vehicle 20*a*, coordinates of each of four points including a point 111, a point 112, a point 113, and a point 114 which represent a contour of the area 110 are calculated. The area 110 is a closed region formed by linking the coordinates of the point 111, the point 112, the point 113, and the point 114. In addition, the control apparatus 24*a* calculates coordinates of each of four points including a point 121, a point 122, a point 123, and a point 124 which represent a contour of the area 120. The area 120 is a closed region formed by linking the coordinates of the point 121, the point 122, the point 123, and the point 124. The control apparatus 24*a* stores the coordinates of each of the point 111, the point 112, the point 113, and the point 114 in association with an area ID assigned to the area 110. In addition, the control apparatus 24*a* stores the coordinates of each of the point 121, the point 122, the point 123, and the point 124 in association with an area ID assigned to the area 120. The transmission control unit 250 then transmits risk area information including the area ID and the coordinates indicating the area 110 and the area 120.

When the vehicle 20*d* receives the risk area information, the control apparatus 24*d* analyzes an image area in which an area surrounded by the four points indicated by the coordinates included in the risk area information is captured from the image acquired by the camera mounted on the vehicle 20*d*, and detects a pedestrian present in a predetermined range including the area. The control apparatus 24*d* transmits response information including a detection result of the pedestrian in the area surrounded by the four points and the area ID, position information of the detected pedestrian, and precision information of the position information to the vehicle 20*a* corresponding to a transmission source of the risk area information.

When the camera system 60 receives the risk area information, the camera system 60 analyses the image area where the area surrounded by the four points indicated by the coordinates included in the risk area information is captured from the image acquired by the image pickup function of the camera system 60, and detects a pedestrian present in a predetermined range including the area. The camera system 60 transmits response information including a detection result of the pedestrian in the area surrounded by the four points and the area ID, position information of the detected pedestrian, and precision information of the position information to the vehicle 20*a* corresponding to the transmission source of the risk area information.

When the terminal 82 receives the risk area information, the terminal 82 acquires current position information of the terminal 82. The terminal 82 transmits response information including the current position information of the terminal 82 and precision information of the position information to the vehicle 20*a* corresponding to the transmission source of the risk area information. In addition, the terminal 82 may judge whether the current position of the terminal 82 is included in an area in a predetermined range including the area surrounded by the four points indicated by the coordinates included in the risk area information, and perform the warning output for the pedestrian 80 when the current position of the terminal 82 is included in the area in the predetermined range including the area.

For example, when the risk area information including the position information of the area 110 and the precision information is received, the terminal 82 may set a first area broader than the area 110 by adding a margin determined from the precision information based on the precision information included in the risk area information. When it is judged that the current position of the terminal 82 is included in the first area, the terminal 82 may perform the warning output for the pedestrian 80. The terminal 82 may set a second area broader than the first area by further taking into account the precision of the current position calculated by the terminal 82, and perform the warning output for the pedestrian 80 when it is judged that the current position of the terminal 82 is included in the second area.

It should be noted that when the risk area is circular, the position information of the risk area may include coordinate information of a central point of the risk area and diameter information of the risk area. When the risk area is polygonal, the position information of the risk area may include coordinate information of a point corresponding to a reference of a polygon and length information of sides such as a width and a height of the risk area. When the risk area is elliptical, the position information of the risk area may include coordinate information of a central point of the risk area and major axis, minor axis, and azimuth angle information.

Figure 4:
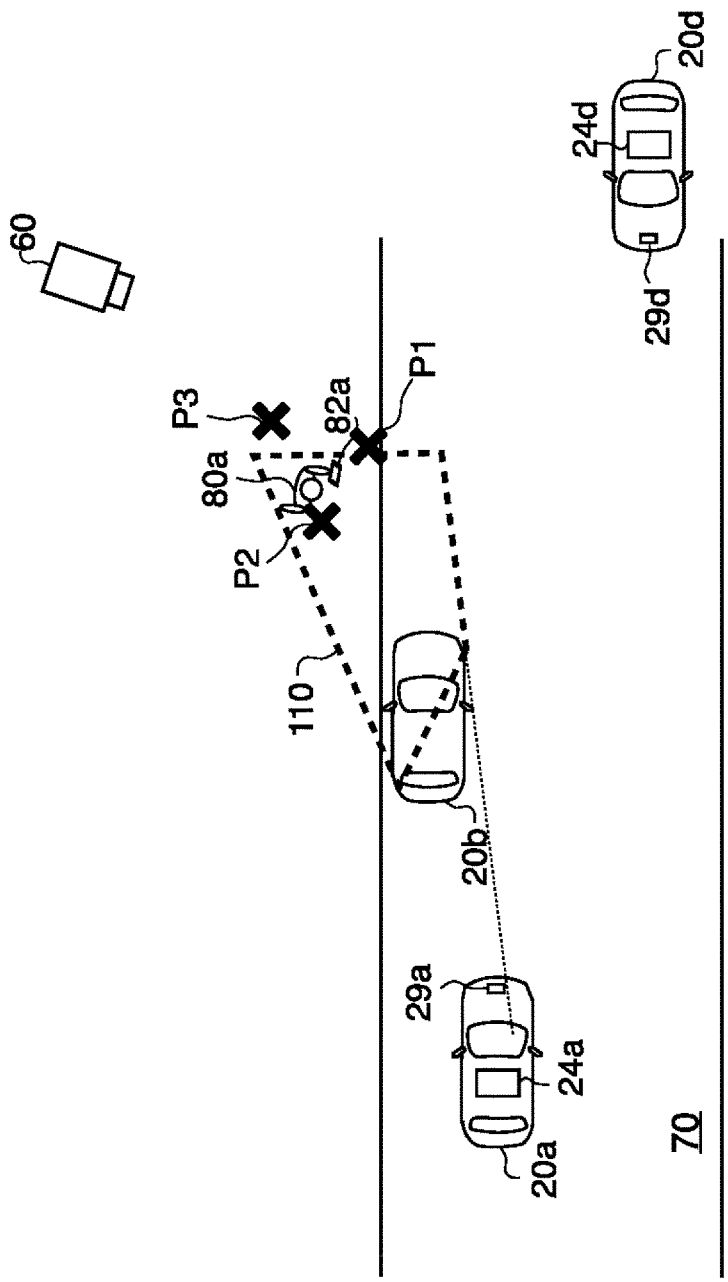

FIG. 4 illustrates one example of the position information detected by the control apparatus 24*d*, the camera system 60, and the terminal 82*a*. In the control apparatus 24*a*, when the risk area identification unit 220 identifies the area 110 as the risk area, the transmission control unit 250 causes the risk area information including the position information of the area 110 and the precision information of the position information of the area to be transmitted by broadcast.

When the risk area information is received, the control apparatus 24*d* identifies the pedestrian 80*a* present in the predetermined range including the area 110 by performing image recognition of the image picked up by the camera included in the sensor 29*d*, and calculates latitude and longitude coordinates of a position of the recognized pedestrian 80*a* based on the image recognition, ranging information by a radar included in the sensor 29*d*, positioning information of the current position by a GNSS sensor included in the sensor 29*d*, map information, or the like. In FIG. 4, the position of the pedestrian 80*a* which is calculated by the control apparatus 24*d* is set as P1. The control apparatus 24*d* calculates a precision of the position P1. For example, the control apparatus 24*d* calculates the precision of the position P1 based on precision information of information used for calculating the position P1. The control apparatus 24*d* then includes the latitude and longitude coordinates and the precision of the position P1 in the response information of the risk area information, and transmits the response information. It should be noted that the precision of the position P1 may be a value uniquely determined by a distance to the position P1. The control apparatus 24*d* may store association information between the distance and the precision, and identify the precision based on the distance to the position P1 and the association information.

When the risk area information is received, the camera system 60 performs image recognition of the image acquired by the image pickup function included in the camera system 60 to identify the pedestrian 80*a* present in the predetermined range including the area 110, and calculates latitude and longitude coordinates of a position of the pedestrian 80*a* based on the image recognition, a position where the camera system 60 is installed, map information, or the like. In FIG. 4, the position of the pedestrian 80*a* which is calculated by the camera system 60 is set as P2. The camera system 60 calculates a precision of the position P2. The camera system 60 then includes the latitude and longitude coordinates and the precision of the position P2 in the response information of the risk area information, and transmits the response information. It should be noted that the precision of the position P2 may be a value uniquely determined by a distance to the position P2. The camera system 60 may store association information between the distance and the precision, and identify the precision based on the distance to the position P2 and the association information.

When the risk area information is received, the terminal 82*a* acquires a current position of the terminal 82*a* by a GNSS positioning function included in the terminal 82*a*. In FIG. 4, the current position detected by the terminal 82*a* is set as P3. The terminal 82*a* calculates a precision of the current position P3. The terminal 82*a* then includes latitude and longitude information and a precision of the position P3 in the response information of the risk area information, and transmits the response information.

For example, when the terminal 82*a* performs positioning of the current position by the GNSS positioning function, a positioning precision in the GNSS positioning function may be used as the precision of the position P3. The positioning precision in the GNSS positioning function may be determined from accuracy information of the positioning precision, a classification of a correction technique used for the positioning by the global positioning system, or the like. The accuracy information may be uniquely determined from, for example, an accuracy value calculated at the time of arithmetic operations of the position information, a number of at least one GNSS satellite used for the positioning, a dilution of precision (DOP) value based on an arrangement state of the GNSS satellite used for the positioning, or the like. Information indicating the correction technique used for the positioning includes, for example, information indicating whether the correction is performed by using real time kinematic (RTK), information indicating whether the correction is performed by using satellite-based augmentation systems (SBAS), or the like. The positioning precision may be uniquely determined by the correction technique used for the positioning such as RTK or SBAS.

When the response information is received from each of the control apparatus 24*d*, the camera system 60, and the terminal 82*a*, the control apparatus 24*a* decides whether control is to be performed by using the latitude and longitude coordinates included in which of the response information based on the precision included in each of the response information. Herein, the precision included in the response information received from the camera system 60 is set to be the highest. In this case, the control unit 208 of the control apparatus 24*a* judges that a pedestrian is present in the position P2, and performs the assistance control of the vehicle 20*a*. With this configuration, as illustrated in FIG. 4, even when the control apparatus 24*d* and the terminal 82*a* judge that the pedestrian 80*a* is present outside the area 110, it is judged that a pedestrian 80*a* is present in the area 110 based on the position P2 of the pedestrian 80*a* which is detected by the camera system 60, and it is possible to perform the assistance control of the vehicle 20*a*.

Figure 5:
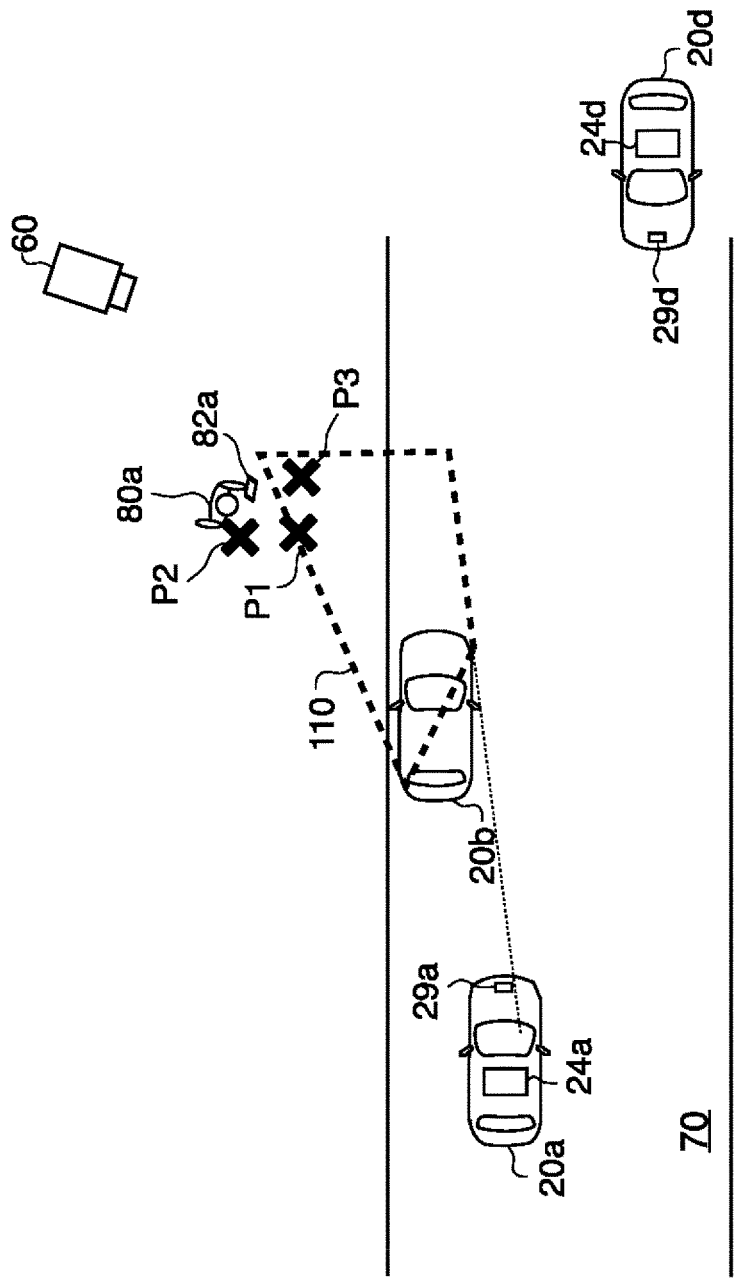

FIG. 5 illustrates another example of the position information detected by the control apparatus 24*d*, the camera system 60, and the terminal 82*a*. FIG. 5 is different from FIG. 4, and illustrates a situation where the pedestrian 80*a* is located outside the area 110.

In the control apparatus 24*a*, when the risk area identification unit 220 identifies the area 110 as the risk area, the transmission control unit 250 causes the risk area information including the position information of the area 110 and the precision information of the position information of the area to be transmitted by broadcast.

As described in relation to FIG. 4, in response to the reception of the risk area information, the control apparatus 24*d* identifies the pedestrian 80*a* present in the predetermined range including the area 110, and calculates the position P1 of the pedestrian 80*a* and the precision of the position P1 to transmit the response information including the position P1 and the precision. Similarly, in response to the reception of the risk area information, the camera system 60 identifies the pedestrian 80a present in the predetermined range including the area 110, and calculates the position P2 of the pedestrian 80a and the precision of the position P2 to transmit the response information including the position P2 and the precision. In addition, in response to the reception of the risk area information, the terminal 82a calculates the current position P3 of the terminal 82a and the precision of the current position P3 to transmit the response information including the position P3 and the precision.

In response to the reception of the response information from each of the control apparatus 24d, the camera system 60, and the terminal 82a, the control apparatus 24a decides whether control is to be performed by using the latitude and longitude coordinates included in which of the response information based on the precision included in each of the response information. Herein, the precision included in the response information received from the camera system 60 is set to be the highest. In this case, the control unit 208 of the control apparatus 24a judges that a pedestrian is present in the position P2 outside the area 110, and the assistance control is not performed. With this configuration, as illustrated in FIG. 5, even when the control apparatus 24d and the terminal 82a judge that the pedestrian 80a is present in the area 110, it is possible to suppress the assistance control to be needlessly performed.

Figure 6:
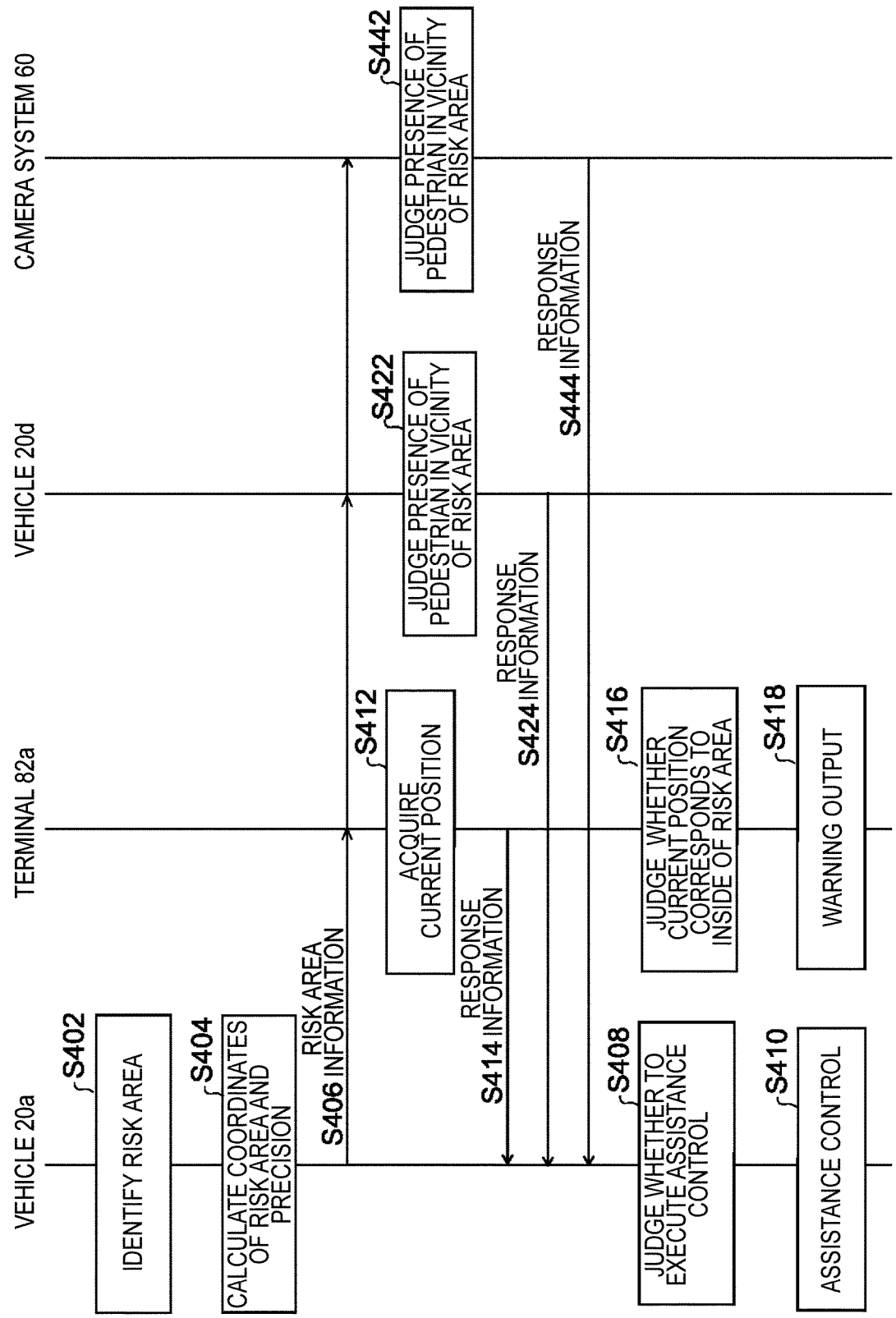
FIG. 6 schematically illustrates a flow of processing executed by a vehicle 20a, the terminal 82a, a vehicle 20d, and the camera system 60.

FIG. 6 schematically illustrates a flow of processing executed by the vehicle 20a, the terminal 82a, the vehicle 20d, and the camera system 60.

In S402, the risk area identification unit 220 identifies a non-line-of-sight area in the advancing direction of the vehicle 20a as the risk area from an image acquired from the sensor 29a. In S404, the risk area identification unit 220 calculates a plurality of latitude and longitude coordinates indicating the risk area and a precision. In S406, the transmission control unit 250 transmits the risk area information. The risk area information includes an area ID, the plurality of latitude and longitude coordinates indicating the risk area and the precision which are calculated in S404, and transmission source information of the risk area information. The area ID is identification information for uniquely identifying the risk area identified in S402. The area ID may be identification information decided by the control apparatus 24a. The transmission source information is identification information for uniquely identifying the vehicle 20a corresponding to a transmission source of the risk area information.

When the risk area information is received, in S412, the terminal 82a acquires latitude and longitude coordinates of a current position of the terminal 82a. In S414, the terminal 82a transmits response information including the latitude and longitude coordinates of the current position which are acquired in S412 and a precision to the control apparatus 24a.

In S422, when the risk area information transmitted from the vehicle 20a is received, the control apparatus 24d of the vehicle 20d detects a pedestrian present in a predetermined range including the risk area. In S424, the control apparatus 24d transmits response information including latitude and longitude coordinates of a position of the detected pedestrian 80 and a precision to the control apparatus 24a.

In S442, when the risk area information transmitted from the vehicle 20a is received, the camera system 60 detects a pedestrian present in a predetermined range including the risk area. In S444, the camera system 60 transmit response information including latitude and longitude coordinates of a position of the detected pedestrian 80 and a precision to the control apparatus 24a.

In S408, the control unit 208 of the control apparatus 24a judges whether to execute the assistance control of the vehicle 20 based on the response information received from the terminal 82a, the response information received from the vehicle 20d, and the response information received from the camera system 60. For example, the control unit 208 selects the latitude and longitude coordinates with the highest precision among the pieces of the latitude and longitude coordinates of the pedestrian 80 included in the received response information. When the selected latitude and longitude coordinates are a position in the risk area, the control unit 208 judges that the assistance control of the vehicle 20 is to be executed. When it is judged in S408 that the assistance control is to be executed, the control unit 208 execute the assistance control (S410). For example, the control unit 208 causes warning information to be outputted by an HMI function of the information output apparatus 40.

After the current position is acquired in S412, the terminal 82a judges in S416 whether the current position of the terminal 82a corresponds to the inside of the risk area. To be specific, when the current position of the terminal 82a which is acquired in S412 is in an area determined based on the plurality of latitude and longitude coordinates included in the risk area information, the terminal 82a judges that the current position of the terminal 82a corresponds to the inside of the risk area. At this time, by taking into account the precision included in the risk area information, the terminal 82a may set a margin according to the precision in the risk area determined by the plurality of latitude and longitude coordinates included in the risk area information to set a first area, and judge that the current position of the terminal 82a corresponds to the inside of the risk area when the current position of the terminal 82a is included in the first area. In S416, when it is judged that the terminal 82a is located in the risk area, in S418, the warning output is performed by using the HMI function of the terminal 82a. In this manner, the risk area information may be information for causing the terminal 82 to output the alert information.

In accordance with the warning system 10 described above, the control apparatus 24 transmits the risk area information including the position information of the risk area and the detection precision by broadcast. With this configuration, the terminal 82 having received the risk area information can safety judge whether the terminal 82 is present in the risk area based on the detection precision included in the risk area information. Thus, the warning output can be appropriately performed for the pedestrian 80. In addition, since the plurality of terminals 82, the camera system 60, and the other vehicle 20 which have received the risk area information transmit the position information of the pedestrian detected in the risk area or the surrounding of the risk area and the detection precision to the control apparatus 24, it is possible to accurately judge whether the pedestrian is present in the risk area. Thus, it is possible to more accurately perform the assistance control.

It should be noted that the vehicle 20 is one example of transport equipment. The transport equipment includes a motor vehicle such as a passenger vehicle or a bus, a riding saddle riding type vehicle, a bicycle, or the like. In addition, the movable object includes, in addition to a person, transport equipment such as a motor vehicle like a passenger vehicle or a bus, a saddle riding type vehicle, or a bicycle.

Figure 7:
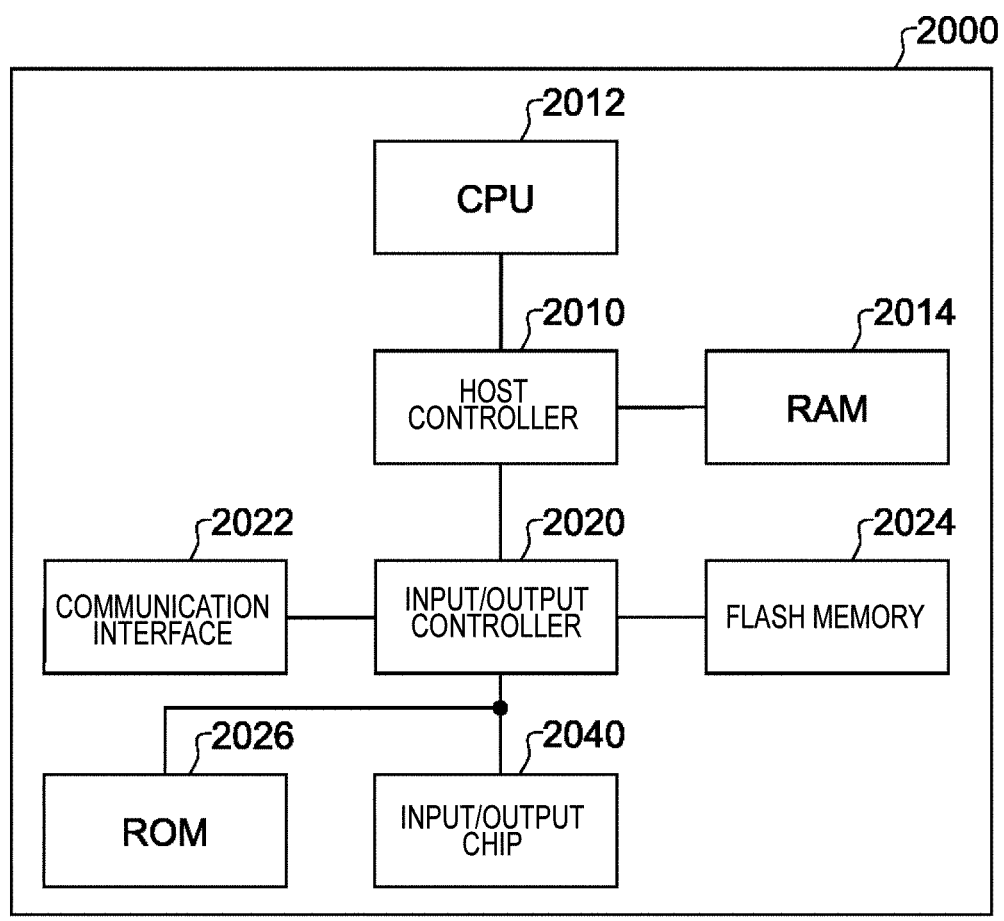
FIG. 7 illustrates an example of a computer 2000.

FIG. 7 illustrates an example of a computer 2000 where a plurality of embodiments of the present invention may be entirely or partially embodied. Programs installed in the computer 2000 can cause the computer 2000 to: function as apparatuses such as the control apparatus 24 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, or an HDMI (registered trademark) port.

The programs are provided via a network or a computer readable medium such as a CD-ROM, a DVD-ROM, or a memory card. The RAM 2014, the ROM 2026, or the flash memory 2024 is an example of the computer readable medium. The programs are installed in the flash memory 2024, the RAM 2014, or the ROM 2026, and are executed by the CPU 2012. Information processing written in these programs is read by the computer 2000, and provides cooperation between the programs and the various types of hardware resources described above. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs to write back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of the plurality of entries described above, an entry with the attribute value of the first attribute specified that meets a condition, read the attribute value of the second attribute stored in above described entry, and thereby acquire the attribute value of the second attribute associated with the first attribute meeting a predetermined condition.

The programs or software module described above may be stored on the computer 2000 or in a computer readable medium near the computer 2000. A recording medium such as a hard disk or RAM provided in a server system connected to a dedicated communication network or the Internet can be used as the computer readable medium. The programs stored in the computer readable medium may be provided to the computer 2000 via the network.

The program that is installed in the computer 2000 and causes the computer 2000 to function as the control device 200 may instruct the CPU 2012 or the like to cause the computer 2000 to function as each unit of the control device 200. The information processing written in these programs are read by the computer 2000 to cause the computer to function as each unit of the control device 200, which is specific means realized by the cooperation of software and the various types of hardware resources described above. Then, these specific means implement operations or processing of information according to the intended use of the computer 2000 in the present embodiment, so that the control device 200 is constructed as a specific control unit according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer readable instruction stored on a computer readable medium, and/or a processor supplied along with the computer readable instruction stored on the computer readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer readable medium may include any tangible device capable of storing an instruction executed by an appropriate device, so that the computer readable medium having the instruction stored thereon constitutes at least a part of a product including an instruction that may be executed in order to provide means to execute an operation specified by a processing procedure or a block diagram. Examples of the computer readable media may include an electronic storage medium, a magnetic storage medium, an optical storage medium, an electromagnetic storage medium, a semiconductor storage medium, or the like. More specific examples of the computer readable medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include either source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: warning system
20: vehicle
21: radar
22: camera
24: control apparatus
25: GNSS reception unit
26: vehicle speed sensor
29: sensor
30: driver assistance control apparatus
40: information output apparatus
48: communication apparatus
50: base transceiver station
60: camera system
70, 72: road
80: pedestrian
82: terminal
90: building
110, 120, 130: area
111, 112, 113, 114, 121, 122, 123, 124: point
200: control device
208: control unit
210: image acquisition unit
220: risk area identification unit
250: transmission control unit
260: reception control unit
280: storage unit
2000: computer
2010: host controller
2012: CPU
2014: RAM
2020: input/output controller
2022: communication interface
2024: flash memory
2026: ROM
2040: input/output chip

What is claimed is:

1. A control apparatus included in a movable object, the control apparatus comprising:
at least one processor;
a risk area identification unit configured to, using the at least one processor, identify a risk area outside the movable object with respect to a movement of the movable object based on an image captured by an image capturing apparatus mounted on the movable object;
a transmission control unit configured to, using the at least one processor, perform control to transmit risk area information including position information of the risk area, and precision information related to a calculation precision of the position information of the risk area to an outside of the movable object without designating a destination, wherein
the transmission control unit is configured to, using the at least one processor, transmit the position information of the risk area and the precision information in such a way as to cause a terminal having received the position information of the risk area and the precision information to determine whether a position of the terminal corresponds to an inside of the risk area based on the position information of the risk area and the precision information, and cause an alert unit included in the terminal to output an alert when it is determined that the terminal is inside the risk area, and
the control apparatus further includes:
a reception control unit configured to, using the at least one processor, perform control to receive response information, which includes position information of another movable object and precision information related to a calculation precision of the position information of the other movable object, as the response information to the risk area information; and a control unit configured to, using the at least one processor, execute control on the movable object based on the position information of the other movable object and the precision information related to the calculation precision of the position information of the other movable object included in the response information.

2. The control apparatus according to claim 1, wherein the transmission control unit is configured to, using the at least one processor, perform control to transmit a plurality of latitude and longitude coordinates of the risk area without designating a destination.

3. The control apparatus according to claim 1, wherein the risk area identification unit is configured to, using the at least one processor, identify an area that is not on a line of sight from a position of the movable object as the risk area.

4. The control apparatus according to claim 3, wherein the risk area identification unit is configured to, using the at least one processor, determine the area that is not on the line of sight by recognizing a target object from an image picked up by the image capturing apparatus.

5. The control apparatus according to claim 1, wherein the response information includes a current position acquired by a terminal having received the risk area information, and precision information related to a calculation precision of the current position.

6. The control apparatus according to claim 1, wherein the response information includes position information recognized by an external apparatus that is outside the movable object and that can recognize the inside of the risk area, and precision information of the position information recognized by the external apparatus.

7. The control apparatus according to claim 6, wherein the external apparatus is another movable object or an infrastructure camera.

8. The control apparatus according to claim 1, wherein when the control unit receives a plurality of pieces of response information as the response information to the risk area information, the control unit is configured to, using the at least one processor, more favorably select position information included in response information including higher precision information among the plurality of pieces of response information, and execute control on the movable object based on the selected position information.

9. The control apparatus according to claim 1, wherein the control unit is configured to, using the at least one processor, execute driver assistance of the movable object or an alert for an occupant of the movable object.

10. The control apparatus according to claim 1, wherein the precision information related to the calculation precision of the position information of the risk area includes information indicating at least one of accuracy information of a positioning precision by a global positioning system or a classification of a correction technique used for positioning by the global positioning system.

11. The control apparatus according to claim 2, wherein the risk area identification unit is configured to, using the at least one processor, identify an area that is not on a line of sight from a position of the movable object as the risk area.

12. The control apparatus according to claim 11, wherein the risk area identification unit is configured to, using the at least one processor, determine the area that is not on the line of sight by recognizing a target object from an image picked up by the image capturing apparatus.

13. The control apparatus according to claim 11, wherein the response information includes a current position acquired by a terminal having received the risk area information, and precision information related to a calculation precision of the current position.

14. The control apparatus according to claim 5, wherein when the control unit receives a plurality of pieces of response information as the response information to the risk area information, the control unit is configured to, using the at least one processor, more favorably select position information included in response information including higher precision information among the plurality of pieces of response information, and execute control on the movable object based on the selected position information.

15. The control apparatus according to claim 1, wherein the movable object is a vehicle.

16. A movable object comprising the control apparatus according to claim 1.

17. A control method comprising:
identifying a risk area outside a movable object with respect to a movement of the movable object based on an image captured by an image capturing apparatus mounted on the movable object; and performing control to transmit risk area information including position information of the risk area, and precision information related to a calculation precision of the position information of the risk area to an outside of the movable object without designating a destination, wherein the performing control to transmit includes transmitting the position information of the risk area and the precision information in such a way as to cause a terminal having received the position information of the risk area and the precision information to determine whether a position of the terminal corresponds to an inside of the risk area based on the position information of the risk area and the precision information, and cause an alert unit included in the terminal to output an alert when it is determined that the terminal is inside the risk area, and the control method further comprises:
performing control to receive response information, which includes position information of another movable object and precision information related to a calculation precision of the position information of the other movable object, as the response information to the risk area information; and executing control on the movable object based on the position information of the other movable object and the precision information related to the calculation precision of the position information of the other movable object included in the response information.

18. A non-transitory computer readable storage medium having stored thereon a program that causes a computer to execute:
identifying a risk area outside a movable object with respect to a movement of the movable object based on an image captured by an image capturing apparatus mounted on the movable object; and performing control to transmit risk area information including position information of the risk area, and precision information related to a calculation precision of the position information of the risk area to an outside of the movable object without designating a destination, wherein the performing control to transmit includes transmitting the position information of the risk area and the precision information in such a way as to cause a terminal having received the position information of the risk area and the precision information to determine whether a position of the terminal corresponds to an inside of the risk area based on the position information of the risk area and the precision information, and cause an alert unit included in the terminal to output an alert when it is determined that the terminal is inside the risk area, and the program causes the computer to further execute:

performing control to receive response information, which includes position information of another movable object and precision information related to a calculation precision of the position information of the other movable object, as the response information to the risk area information; and executing control on the movable object based on the position information of the other movable object and the precision information related to the calculation precision of the position information of the other movable object included in the response information.

* * * * *